United States Patent
Wang et al.

(10) Patent No.: US 7,639,173 B1
(45) Date of Patent: Dec. 29, 2009

(54) MICROWAVE PLANAR SENSOR USING PCB CAVITY PACKAGING PROCESS

(75) Inventors: Nan Wang, Shanghai (CN); Shixiong Fan, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/332,680

(22) Filed: Dec. 11, 2008

(51) Int. Cl.
*G01S 7/28* (2006.01)
*G01S 13/62* (2006.01)

(52) U.S. Cl. .......................... 342/28; 342/114; 342/175
(58) Field of Classification Search .................. 342/28, 342/175, 114–115
See application file for complete search history.

(56) References Cited

U.S. PATENT DOCUMENTS

| | | | | |
|---|---|---|---|---|
| 5,262,783 A | * | 11/1993 | Philpott et al. | 342/28 |
| 5,563,617 A | * | 10/1996 | Redfern et al. | 343/767 |
| 5,914,684 A | * | 6/1999 | Brettner, III | 342/175 |
| 5,977,874 A | * | 11/1999 | Konstandelos | 340/554 |
| 6,087,972 A | * | 7/2000 | Puglia et al. | 342/28 |
| 6,091,355 A | * | 7/2000 | Cadotte et al. | 342/104 |
| 6,756,936 B1 | * | 6/2004 | Wu | 342/175 |
| 2009/0166249 A1 | * | 7/2009 | Wang et al. | 206/719 |

FOREIGN PATENT DOCUMENTS

JP 05113478 A * 5/1993

* cited by examiner

*Primary Examiner*—John B Sotomayor
(74) *Attorney, Agent, or Firm*—Husch Blackwell Sanders Welsh & Katz

(57) ABSTRACT

A microwave planar sensor for detecting the presence and movement of a target in a detection area, including a microwave board and a support board. The microwave board includes an oscillator/mixer layer, an antenna layer and a ground layer sandwiched between the oscillator/mixer layer and the antenna layer, when the oscillator/mixer layer and the antenna layer are bonded together. The oscillator/mixer layer includes an oscillator configured to generate at least one microwave signal and a signal mixer electrically coupled to the oscillator. The signal mixer is configured to combine a microwave signal generated by the oscillator and a reflected signal reflected by the target in the detection area, thereby generating an intermediate frequency signal having a Doppler frequency. The antenna layer includes a transmit antenna coupled to the oscillator for transmitting a microwave signal generated by the oscillator into the detection area and a receive antenna coupled to the signal mixer for receiving a reflected signal reflected by the target. The support board includes a top surface bonded to the microwave board through a first metal layer coated on the top surface. The support board further includes a continuous cavity extending from the top surface for accommodating the oscillator and the mixer of the oscillator/mixer layer, the surface of the cavity coated with a second metal layer.

20 Claims, 10 Drawing Sheets

MICROWAVE PLANAR SENSOR USING PCB CAVITY PACKAGING PROCESS

FIELD OF THE INVENTION

The present invention relates generally to microwave transceivers usable in motion detectors, such as Doppler radar sensors for detecting a moving target in the security industry. More particularly, the present invention relates to a microwave planar transceiver, which adopts a support board for packaging the microwave circuits to implement a chip on board design where all components are surface-mounted.

BACKGROUND

Microwave motion detectors having a microwave transceiver are able to detect the existence of a moving object, such as an intruder, in an area monitored by the motion detector.

Generally, the motion detector transmits a microwave signal toward the detection area and in the event that a moving object passes through the monitored area, the microwave signal is reflected back (echo) from such movement and is modulated due to the Doppler Effect. When a signal is reflected from a moving object, it is shifted in frequency. The shift in frequency is called the Doppler Effect and is directly proportional to the target velocity. Typically, a maximum frequency shift occurs when the object is moving straight towards the sensor and a minimum frequency shift occurs when the object is moving at 90 degrees orthogonal to the sensor. All Doppler sensors use this principle to detect moving objects in the detection area.

Traditionally, the microwave sensors are built to have a cavity transceiver to meet the operational requirement of the sensor on high frequency bands, such as a K-band. In the waveguide-cavity-based transceiver, the microwave signal is generated from a waveguide cavity oscillator using suitable diode, and the receiver has similar waveguide structure to receive the reflected signals. Due to the complex assembling and high power consumption, planar microwave circuit has been developed to substitute the waveguide structure, especially those waveguide sensors used in the civil field.

However, the existing microwave planar sensors have disadvantages with respect to their packaging processes and electromagnetic shielding. Traditionally, microwave circuits used in the microwave planar sensors are shielded through either metal casting process or metal stamping process, each of which exhibits undesirable disadvantages.

In the metal casting process, firstly an initial cost for breaking a mould is inevitable, which is normally expensive. In addition, due to the fact that the soldering techniques are not applicable to metal casting, conductive adhesives are necessary for physically and electrically connecting the metal components of the circuits to the PCB board. The conductive adhesives consist of silver paste for implementing the electrical connection, which in turn significantly raises the cost of the adhesives as well as the entire sensor. Moreover, the application of the conductive adhesives is laborious and requires certain proficiency of the workers, unless a designated adhesive-applying machine is used, which again increases the manufacturing cost and further does not provide the compatibility of working on different designs. In addition, the metal casting processes require a curing time after applying the conductive adhesives, which results in prolonging of manufacturing and low production efficiency. Last, the structure strength of the connection implemented by conductive adhesives is not satisfactory, especially when the sensor is used under critical circumstances. Thus, the failure of the sensor due to the breaking of the connection may happen.

In the metal stamping process, consistency of the critical geometrical parameters of the sensor cannot be maintained due to the inherent deficiency of metal stamping with regard to its accuracy and precision. However, the consistency of the dimensions of the device components and the accuracy of the positional relationship between the different components play a critical role for implementing the functionality of the sensor, in that any structural deviation of the sensor may cause a shift in the frequency of the signal, especially in high frequency bands. In addition, in order to facilitate metal stamping, soft metallic materials are normally adopted, which produces a basic enclosing structure with thin-walls made of soft metallic materials, such as the resonant cavity. Thus, it is difficult to further incorporate tuning structures on the stamped parts in order to enhance the performance of the sensor and expand the applications of the sensor.

Moreover, the above-discussed processes pose another problem that the microwave circuits of the sensors are not electromagnetically shielded satisfactorily. Thus, electromagnetic interference with environmental signal may happen, which would impact the performance and reliability of the sensors.

Practically, microwave sensors used in security industry are usually secured at a predetermined location, such as a wall, to scan a predetermined coverage area. Thus, the detecting scope of a sensor is fixed, once the sensor is secured to the wall. In case the application circumstances of the sensor require adjusting the detecting scope, the angle between the sensor and the wall has to be changed by either remounting the sensor in the case to assume a new desirable orientation or changing the relative positions between the wall and the sensor case. Furthermore, in some cases, the detecting angle has to be tuned more or less depending on the specific application of the sensor, so as to realize the best performance of the sensor. Thus, it is desirable to avoid the complex and laborious procedures in the art to adjust the detecting angle of the sensor.

Thus, it would be desirable and advantageous to provide a microwave planar sensor, which is capable of saving manufacturing costs by excluding conductive adhesives with silver paste.

Thus, it would be desirable and advantageous to provide a microwave planar sensor, which is capable of improving the reliability of the connection between the metal components of the circuits and the PCB board.

Thus, it would be desirable and advantageous to provide a microwave planar sensor, which is capable of cutting down the time incurred in the manufacturing process and lowering the proficiency requirement for the workers in the production line, thereby improving production efficiency.

Thus, it would be desirable and advantageous to provide a microwave planar sensor, which is capable of maintaining a geometrical consistency of the physical structures of the sensor, thereby improving the performance of the sensor.

Thus, it would be desirable and advantageous to provide a microwave planar sensor, which is capable of tuning or adjusting the detecting angle of the sensor, thereby providing a sensor with improved resilience and compatibility.

Thus, it would be desirable and advantageous to provide a microwave planar sensor, which is capable of providing a satisfactory electromagnetic shielding for the microwave circuits, so as to prevent the microwave circuits from being interfered with the environment signals and noises within the vicinity of the microwave circuits.

SUMMARY OF THE INVENTION

Disclosed is a microwave planar sensor for detecting the presence and movement of a target in a detection area, including a microwave board and a support board. The microwave board includes an oscillator/mixer layer, an antenna layer and a ground layer sandwiched between the oscillator/mixer layer and the antenna layer, when the oscillator/mixer layer and the antenna layer are bonded together. Optionally, the microwave board is made of a non-Teflon material.

The oscillator/mixer layer includes an oscillator configured to generate at least one microwave signal and a signal mixer electrically coupled to the oscillator. The signal mixer is configured to receive and combine a microwave signal generated by the oscillator and a reflected signal reflected by the target in the detection area, thereby generating an intermediate frequency signal having a Doppler frequency.

The antenna layer includes a transmit antenna coupled to the oscillator for transmitting a microwave signal generated by the oscillator into the detection area and a receive antenna coupled to the signal mixer for receiving a reflected signal reflected by the target.

The support board includes a top surface coupled to the oscillator/mixer layer of the microwave board through a first metal layer coated on the top surface. The support board further includes a continuous cavity extending from the top surface for accommodating the oscillator and the mixer of the oscillator/mixer layer, the surface of the cavity coated with a second metal layer. Optionally, the support board is made of a non-Teflon material.

According to another aspect of the present invention, the continuous cavity of the support board extends through the support board to provide a through cavity and the microwave planar sensor further includes a baseboard coupled to a bottom surface of the support board.

Preferably, the baseboard includes a top surface coupled to the bottom surface of the support board through a third metal layer coated on the top surface of the baseboard.

According to still another aspect of the present invention, the baseboard includes a first sub-board and a second sub-board, movable relative to one another. The first sub-board is coupled to a bottom surface of the support board.

Preferably, at least one connector is disposed between the first sub-board and the second sub-board for adjusting the distance between the first sub-board and the second sub-board to changing the detecting angle of the sensor.

Preferably, the connector includes a post disposed between the first sub-board and the second sub-board and a block mating with the post to adjust the distance between the first sub-board and the second sub-board. The post has an outer thread and the block has an inner thread mating with the outer thread, such that turning the block moves the block relative to the post.

Preferably, the baseboard includes a tuning screw for adjusting the operative frequency of the sensor Preferably, the baseboard includes a metal base associated with the tuning screw, the metal base soldered to the first sub-board.

BRIEF DESCRIPTION OF THE DRAWINGS

These and other features, benefits, and advantages of the present invention will become apparent by reference to the following text and figures, with like reference numbers referring to like structures across the view, wherein.

DETAILED DESCRIPTION OF THE INVENTION

The present invention now will be described in detail hereinafter with reference to the accompanying drawings, in which exemplary embodiments of the invention are shown. However, this invention may be embodied in many different forms and should not be construed as limited to the embodiments set forth herein. Like numerals refer to like elements throughout.

Figure 1:
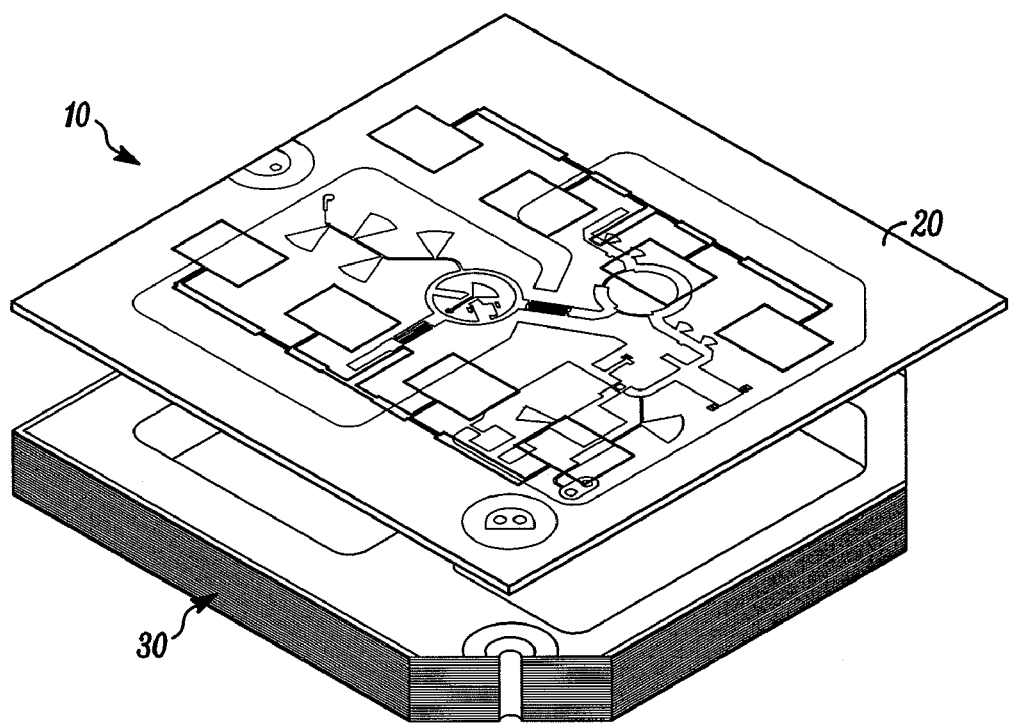
FIG. 1 is an exploded perspective view of a microwave planar sensor providing an electromagnetic shielding for the microwave circuit of the sensor, according to an exemplary embodiment of the present invention.
Figure 2:
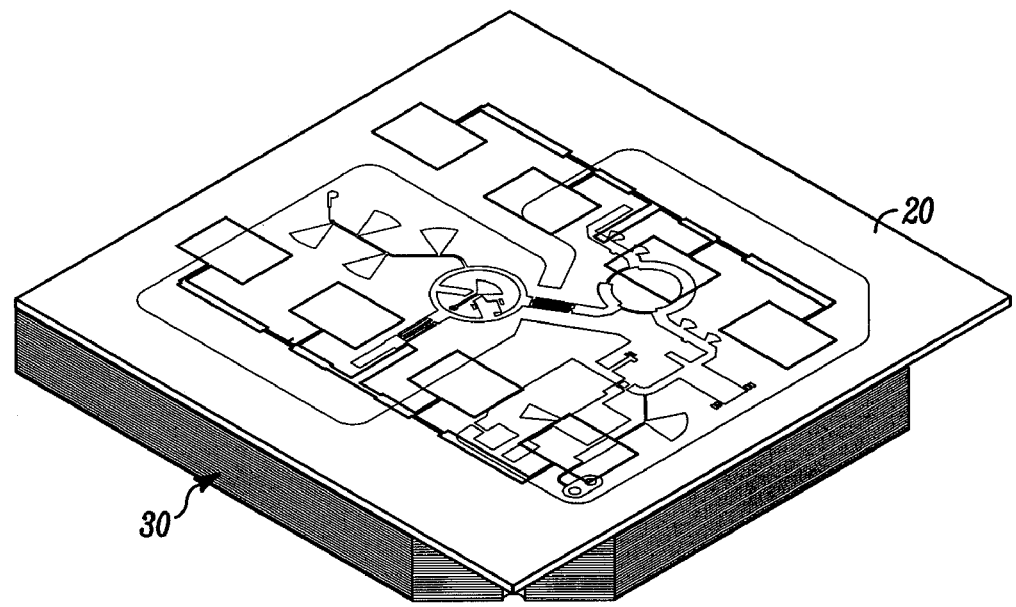
FIG. 2 is a compact perspective view of the microwave planar sensor shown in FIG. 1.

FIGS. 1 and 2 illustrate a microwave planar sensor 10 according to an exemplary embodiment of the present invention. Generally, the sensor 10 includes a microwave board 20 and a support board 30. The support board 30 is substantially complementary to the microwave board 20, in term of the shape and layout of the structures. The support board 30 is connected to the microwave board 20 through any suitable means, such as adhering agents or solders.

Figure 3:
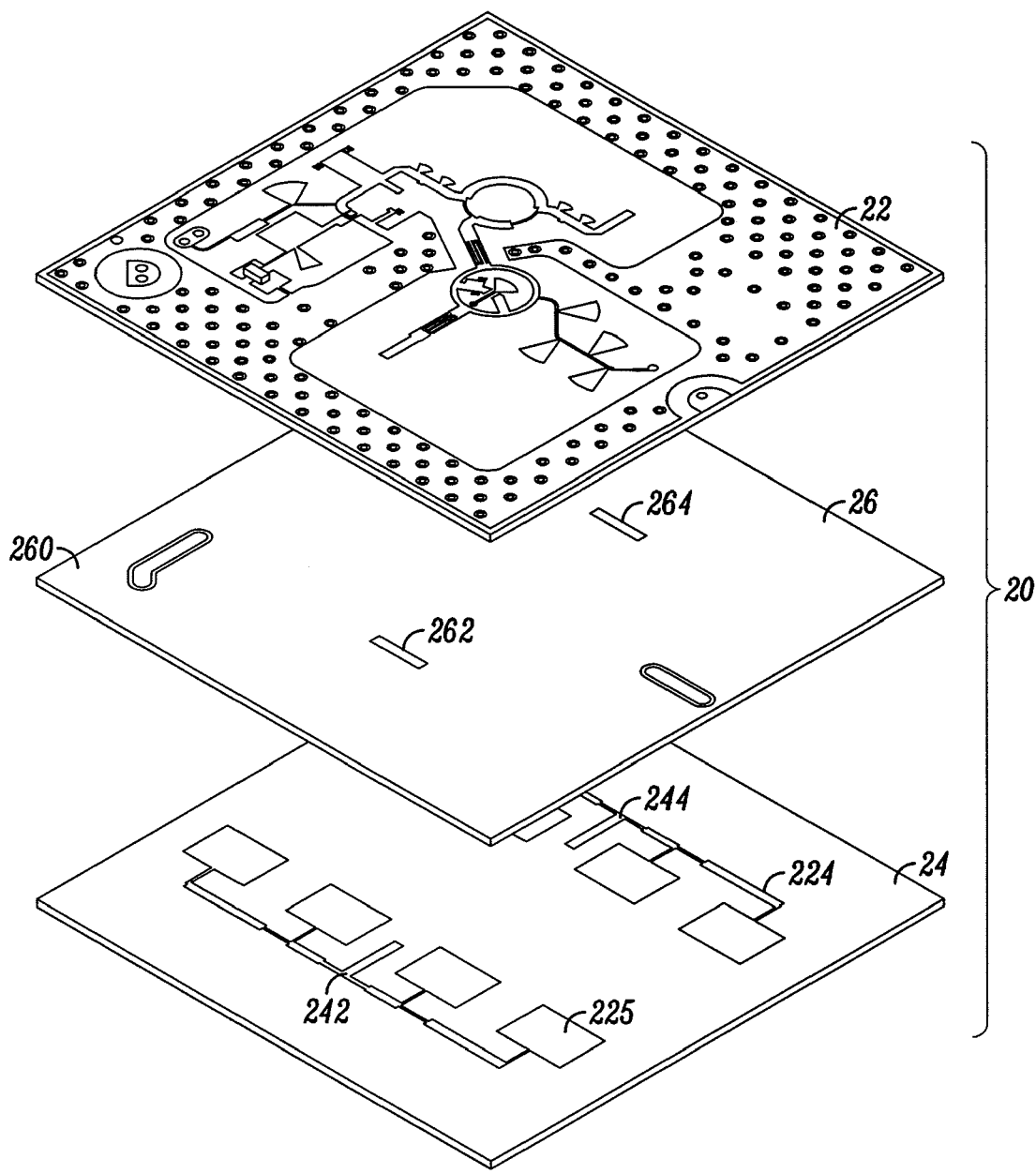
FIG. 3 is an exploded perspective view of a microwave board of the microwave planar sensor shown in FIG. 1.

Referring to FIG. 3, a three-layered configuration of the microwave board 20 is illustrated. The microwave board 20 includes oscillator/mixer layer 22, an antenna layer 24, and a ground layer 26 sandwiched by the oscillator/mixer layer 22 and an antenna layer 24. The oscillator/mixer layer 22 and the antenna layer 24 are overlaid and bonded as an integral structure, for example by a bonding film or solder, with the common ground layer 26 sandwiched therebetween.

Optionally, a non-Teflon-based material is used as substrates for all three layers, such as the non-Teflon-based material RO4350B available from Rogers Corporation. The non-Teflon-based materials are much cheaper compared to Teflon-based materials, but can still provide a satisfactory performance. In addition, the processing of the non-Teflon-based materials is generally same to the Teflon-based materials. Thus, same facilities for processing standard low frequency PCB materials can be used for processing the non-Teflon-based materials.

Figure 4:
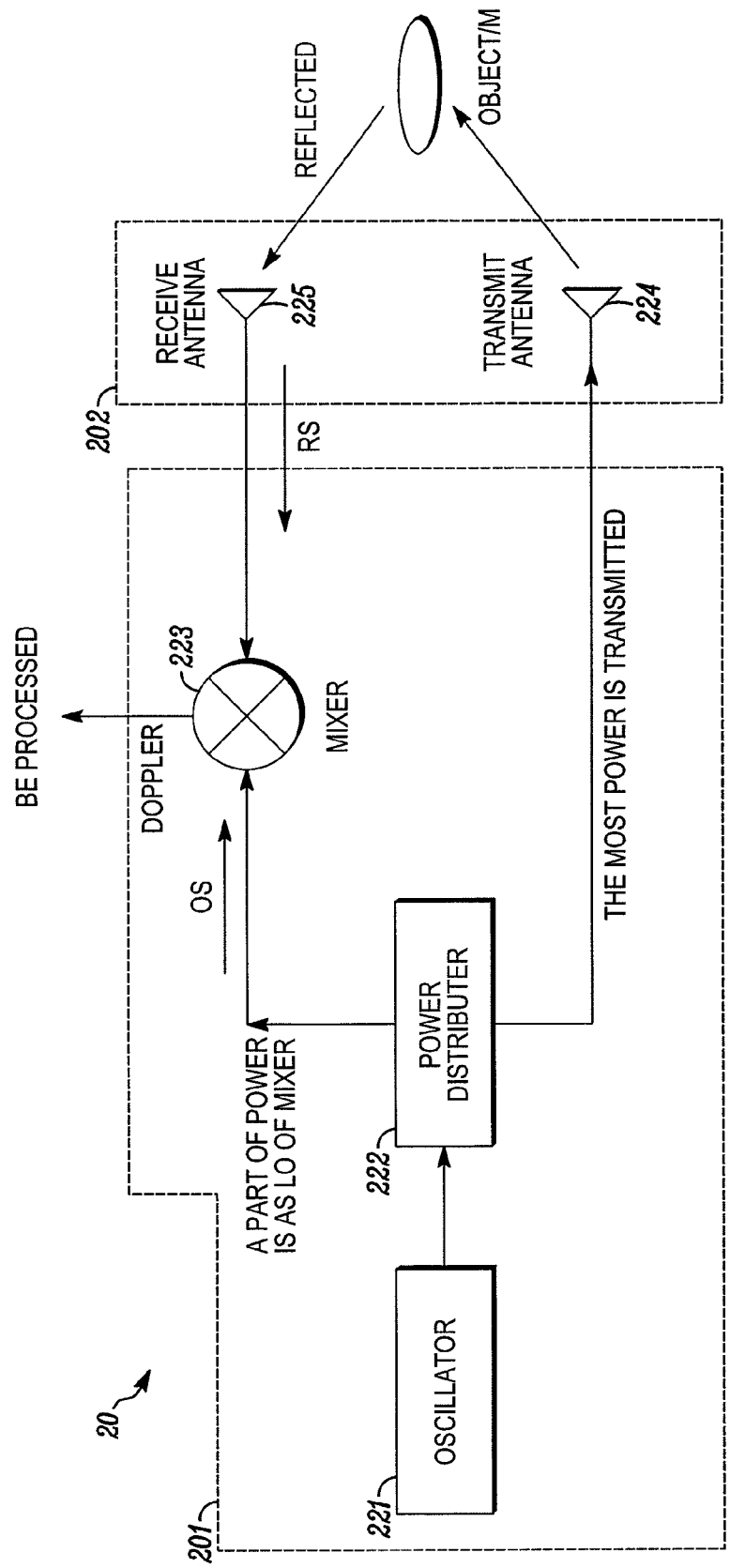
FIG. 4 is functional block diagram of the microwave board shown in FIG. 3.

Referring to FIG. 4, a functional block diagram of the microwave board 20 is illustrated. The microwave board 20 generally includes an oscillator/mixer section 201 corresponding to the oscillator/mixer layer 22 and an antenna section 202 corresponding to the antenna layer 24, both shown in phantom lines.

The oscillator/mixer section 201 includes an oscillator 221 configured to generate a serial of pulsed microwave signals at a predetermined frequency. The oscillator 221 can be a low Q oscillator or a high Q oscillator depending on the application circumstances. The output signal from the oscillator 221 is coupled to the input of a power distributor 222. Optionally, a signal modulating module (not shown) consisting of a direct current (DC) block and a filter can be disposed between the oscillator 221 and the power distributor 222, for modulating the output signals from the oscillator 221. Thus, the signal generated by the oscillator 221 is tuned to export the power as high as possible with low phase noise.

The filter, preferably a low pass filter, is used to exclude the undesirable harmonics to improve the receiving elements' performance. The output signal of the filter is divided by the power distributor 222, which is for example in the form of annular ring, into two parts. The two parts of the output signal are not even, most of the power transmitted through a transmit antenna as the transmitting signal and the remaining coupled to a signal mixer as driver for generating a mixed signal.

Optionally, the DC block can be configured from microstrips rather than consisting of a discrete capacitor as in conventional transceivers.

A portion of the local oscillator signal from a first output of the power distributor 222 is coupled to a transmit antenna 224 of the antenna section 202, which is also shown in FIG. 3. The transmit antenna 224 functions to transmit the oscillator signal into a detection area monitored by the microwave planar sensor 10 using the microwave board 20. The transmit antenna 224 can be any suitable antennas, such as patch-array antennas.

Another portion of the local oscillator signal (OS shown in FIG. 4) from a second output of the power distributor 222 is coupled to a signal mixer 223. In the event a moving object M is present in the detection area, the signal transmitted by the transmit antenna will be reflected. The reflected signal (RS shown in FIG. 4) is received by a receive antenna 225, and further transmitted to the signal mixer 23. Similarly, the receive antenna 225 can be any suitable antennas, such as patch-array antennas.

The signal mixer 223 combines the reflected signal RS and the oscillator signal OS to provide an intermediate frequency (IF) signal that comprises a Doppler frequency. The IF signal can be used for determining the movement of the object in the detection area.

Figure 5:
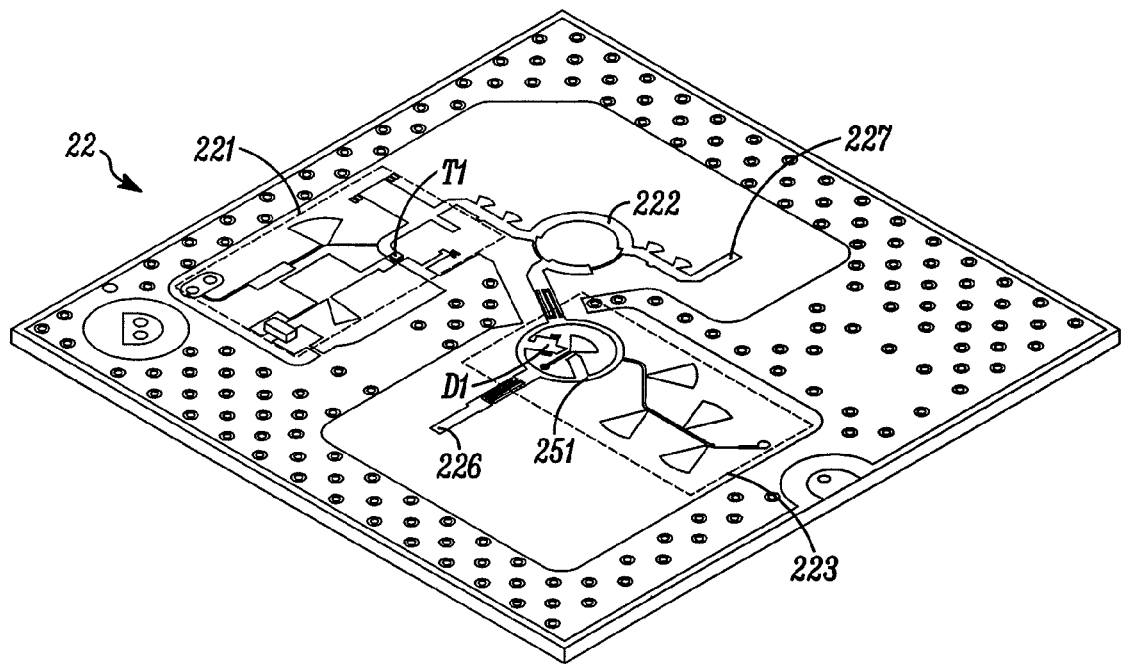
FIG. 5 is a perspective view showing the oscillator/mixer layer of the microwave board shown in FIG. 3.

FIG. 5 illustrates the microstrip layout of the oscillator/mixer section 201 of the microwave board 20, as viewed from the component side of the microwave board 20 that supports the circuitry of the oscillator/mixer section 201. The performance of the microwave planar sensor 10 at high frequencies or low frequencies is enabled by the use of surface mounted chip devices in the oscillator and mixers without the limitation of the packages. All of the microstrips can be seen in relation to each other, and in relation to the transmission lines, filters and other components that are formed thereby. The circuitry of the oscillator 221 and the mixer 223 are both shown in phantom lines in FIG. 5. The circuitry of the mixer 223 includes a coupling microstrip 226, for implementing an electrical coupling between the mixer 223 and the receive antenna 225. The circuitry of the power distributor 222 includes a coupling microstrip 227, for implementing an electrical coupling between the power distributor 222 and the transmit antenna 224.

Figure 6:
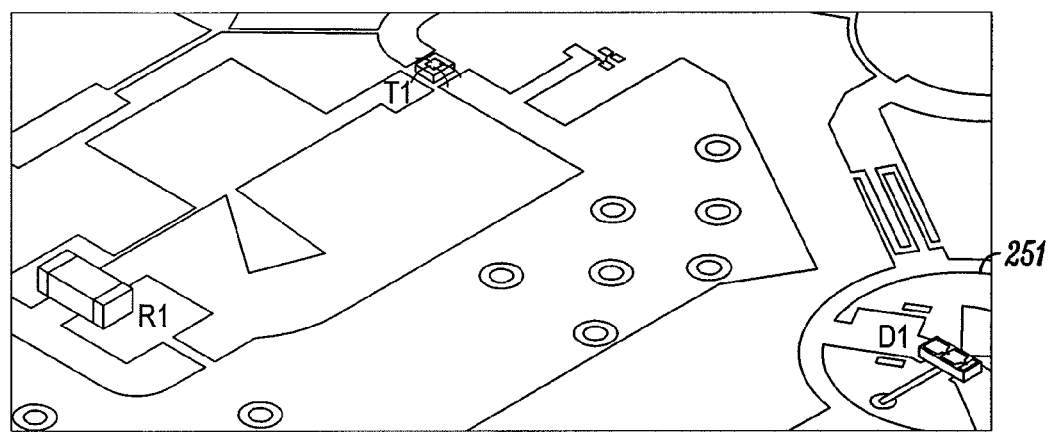
FIG. 6 is a detailed microstrip layout of the oscillator and mixer of the microwave board shown in FIG. 3.

In one exemplary embodiment, the oscillator 221 is designed to be a negative resistance oscillator and achieved by the equivalent distributed microstrip circuit. As best shown in FIG. 6, the oscillator 221 includes a surface mounted microwave FET chip T1 for generating a plurality of oscillator signals. For example, FET T1 is a surface mounted microwave FET chip, including but not limited to HBT, HEMT, and PHEMT. In the motion detection area, since the Doppler shift is usually very low, the 1/f flicker noise is the most important parameter, so that chips with lower phase noise are preferred in the sensor. Also shown in FIG. 6 is source bias resistor R1 of the oscillator circuit.

Figure 7:
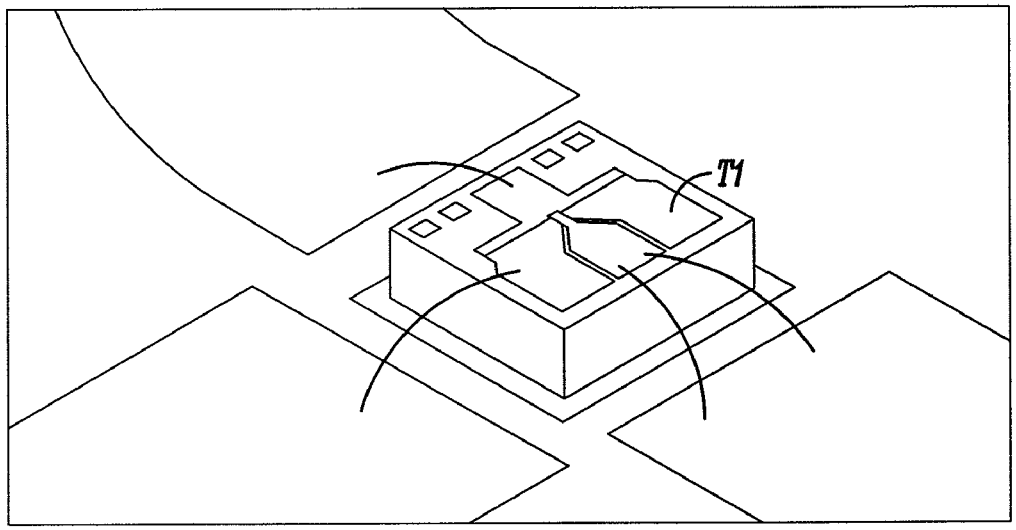
FIG. 7 is a detailed microstrip layout of a surface mounted microwave FET (Field Effect Transistor) chip wire bonded in the oscillator circuit of the microwave board shown in FIG. 3.

Optionally, as shown in FIG. 7, the surface mounted microwave FET chip T1 is wire bonded to the microstrips in FIG. 5. Considering the Doppler shift is low in the application of security industry, it is preferred to use chips with lower phase noise. Furthermore, due to the multilayered design of the microwave board 20 and the surface mounted features of the chips, the oscillator 221 does not require use of a dielectric resonator, while still able to maintain a satisfactory performance.

As best shown in FIG. 6, the mixer 223 includes a surface mounted diode chip D1 for generating a Doppler effect signal by combining the oscillator signal OS and the reflected signal RS reflected by a moving target in the detection zone. For example, D1 is a surface mounted Schottky chip, including but not limited to HVMSK-1 or TOMSK-1 available from Metelics.

Figure 8:
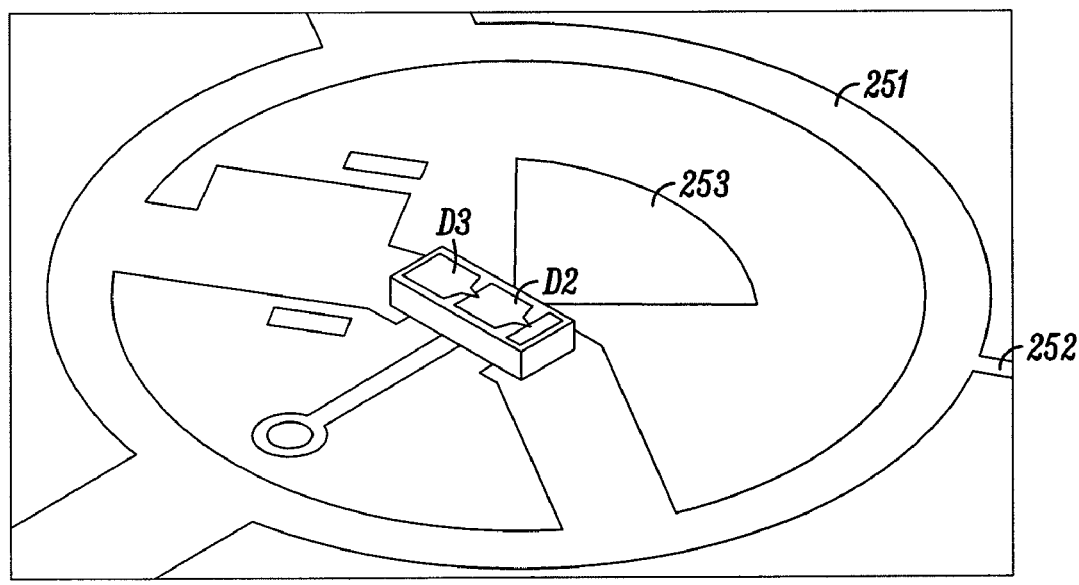
FIG. 8 is a detailed microstrip layout of a surface mounted diode chip wire bonded in the mixer circuit of the microwave board shown in FIG. 3.

Now referring to FIG. 8, the mixer 223 is of a compact and small design. For example, the mixer 223 is of single balanced topology of microwave planar circuit, in which a pair of diodes D2 and D3 are surface mounted on the center of a 3 dB ring 251 (shown in FIGS. 5, 6 and 8). The IF signal is exported from a ¼λ isolated port 252 of the ring 251, and a fan-stub 253 is disposed in the center to be the AC ground components shared by the both diodes D2 and D3. For example, the diodes might be GaAs or Si based, packaged by beam-lead or flip-chip process.

Figure 9:
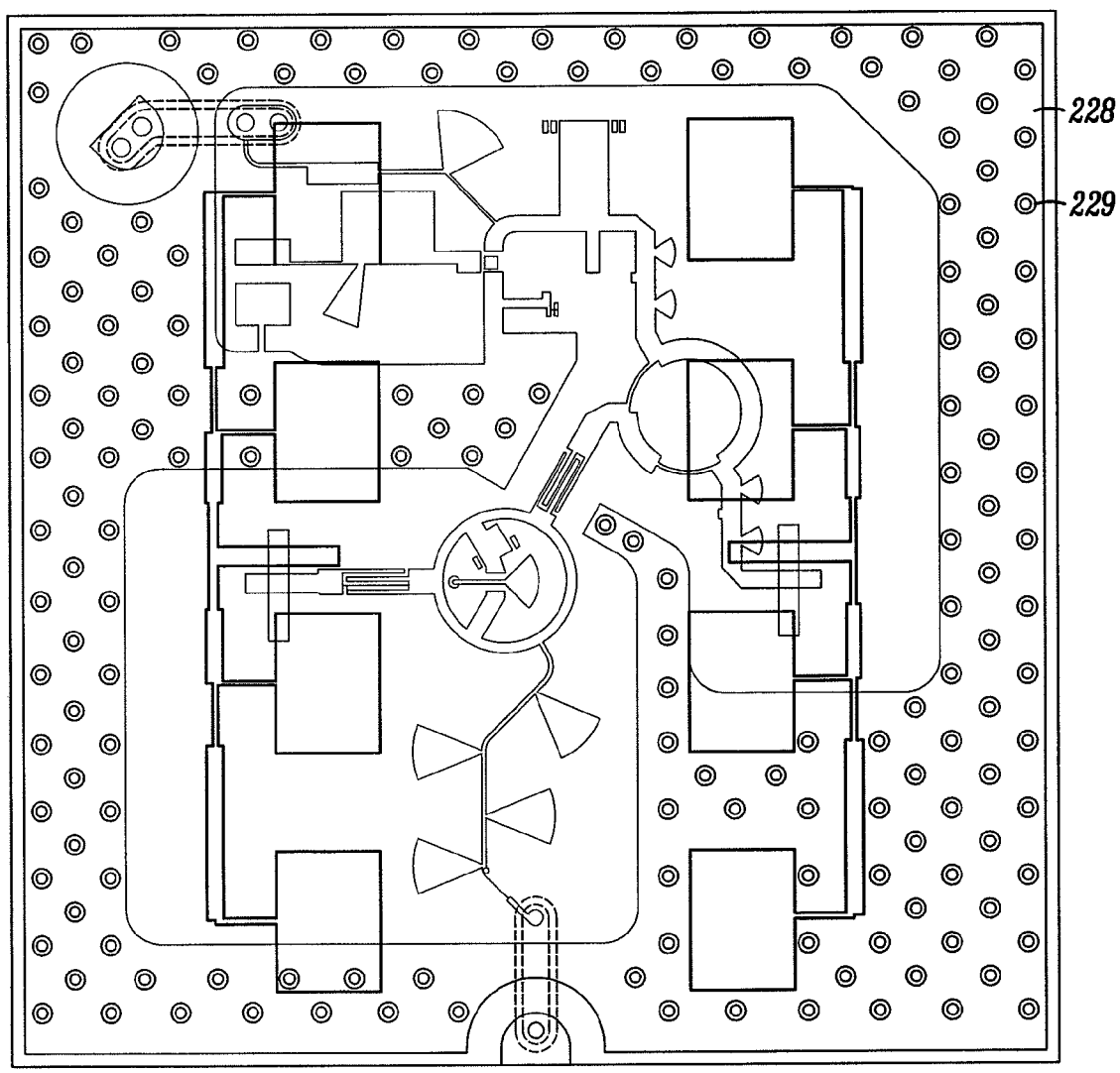
FIG. 9 is a plan view the microwave board shown in FIG. 3.

Now the electrical and mechanical coupling of the oscillator/mixer layer 22, the antenna layer 24 and the ground layer 26 will be described in conjunction with FIGS. 3 and 9.

As shown by reference numeral 24 in FIG. 3, the antenna layer 24 is patterned with copper to form a patch array including the receive antenna 225 and the transmit antenna 224. In the shown exemplary embodiment, the antennas are a 1×4 array. However, the antenna arrays may be 1×4, 2×2 or N×M array depending on the particular security requirements. In addition, the antenna array can be a slot array. The antenna can also be a non-array antenna, such as a single patch, single slot, horn antenna, or any combination of the above antennas.

The receive antenna 225 has a coupling microstrip 242 for coupling the receive antenna 225 to the corresponding microstrip 226 of the mixer 223. The transmit antenna 224 has a coupling microstrip 244 for coupling the transmit antenna 224 to corresponding microstrip 227 of the power distributor 222.

Referring back to FIG. 3, it illustrates the ground layer 26 sandwiched between the oscillator/mixer layer 22 and the antenna layer 24. For example, the ground layer 26 is in the form of a thin board coated with copper layer to provide a ground plane 260. The ground layer 26 has a pair of slots 262 and 264, through which the microstrip 226 of the mixer 223 and the microstrip 227 of the power distributor 222 are coupled to the receive antenna 225 and the transmit antenna 224, respectively. Specifically, the slot 262 is orthogonal to the microstrip 242 of the receive antenna 225 on the antenna layer 24 and the microstrip 226 of the mixer 223 on the oscillator/mixer layer 22. The slot 264 is orthogonal to the microstrip 244 of the transmit antenna 224 on the antenna layer 24 and the microstrip 227 on the power distributor 222 of the oscillator/mixer layer 24.

The oscillator/mixer layer 22 and the antenna layer 24 can be fabricated from a soft substrate material. The two layers are bonded together, for example, by a bonding film, sharing a common ground plane 260. The resultant structure includes the antenna layer 24 superimposed over the oscillator/mixer layer 22, with a copper layer sandwiched therebetween. Each antenna has a respective microstrip that substantially overlies an associated microstrip on the microwave circuit board. The ground plane layer has, for each antenna, a respective slot to provide coupling between the antenna microstrip and the associated microstrip on the oscillator/mixer layers.

Figure 10:
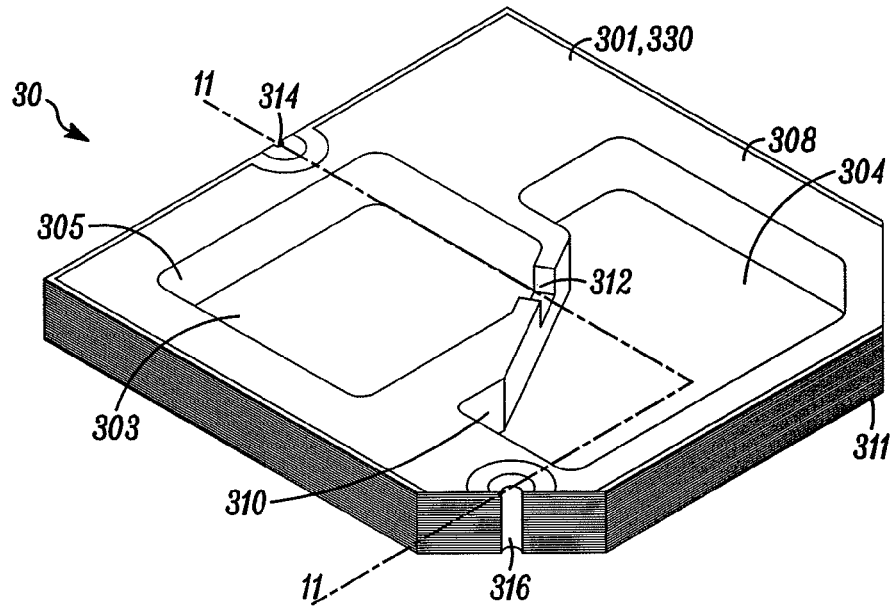
FIG. 10 is perspective view of the support board shown in FIG. 1.
Figure 11:
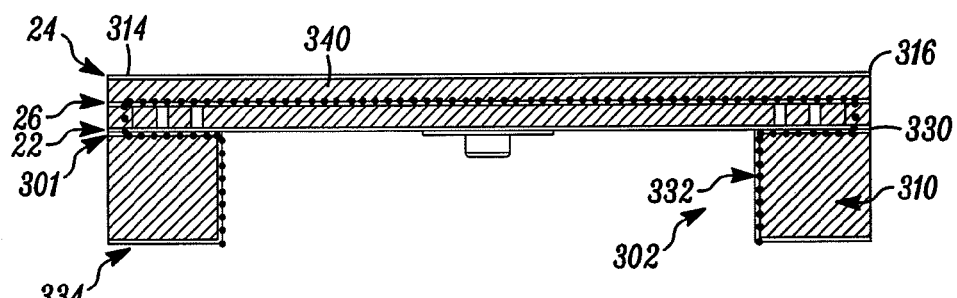
FIG. 11 is a schematic sectional view of the microwave planar sensor, along the sectional line 11-11 shown in FIG. 10, illustrating a half shielded cavity provide by the combination of the microwave board and the support board.
Figure 12:
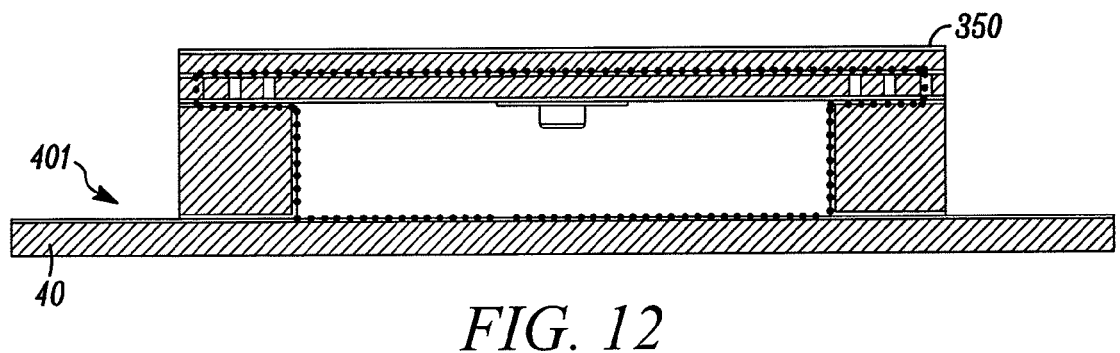
FIG. 12 is a schematic sectional view of a microwave planar sensor including a baseboard, along the sectional line 11-11 shown in FIG. 10, illustrating a closed shielded cavity provided by the combination of the microwave board, the support board and the baseboard.

Referring to FIGS. 10-12, the PCB cavity packaging scheme according to an aspect of the present invention will be described.

FIG. 10 depicts the structural feature of the support board 30, which is bonded or adhered to the microwave board 20 shown in FIG. 1. FIG. 11 is a sectional view of the microwave planar sensor 10 along the sectional line 11-11 in FIG. 10.

Generally, the support board 40 is designed to have a hollowed middle section for providing a half-closed cavity to accommodate the associated electrical elements of the microwave board 10. The outer profile of the support board 30 is substantially complementary to the outer profile of the microwave board 20, to provide a compact, unitary and continuous device after the microwave board 20 and the support board 30 are bonded together.

As illustrated in FIG. 11, the antenna layer 24 is positioned on the top of the module. Most area of the antenna layer 24 is bare substrate, except the antenna metal pattern. The respective metal coatings of the microwave board 20 and the support board 30 are soldered together, with the ground pattern of the microwave board 20 and the support board 30 providing an electromagnetic shielding.

As shown in FIGS. 10 and 11, the support board 30 includes a top surface 301 coated with a first metal layer 330. The top surface 301 and the first metal layer 330 are bonded to the oscillator/mixer layer 22 of the microwave board 20 to provide a mechanical and electrical interface between the microwave board 20 and the support board 30.

The support board 30 further includes a continuous cavity 302 defined by a peripheral wall 308 of the support board 30. The continuous cavity 302 provides a space for accommodating the electrical and/or electronic components of the microwave board 20. The surface 305 of the continuous cavity 302 is coated with a second metal layer 332 (shown in FIG. 11) for the purpose of providing an electromagnetic shielding for the components of the microwave board 20. The first metal layer 330 and the second metal layer 332 can be formed by any suitable metallic materials, preferably copper. The first metal layer 330 and the second metal layer 332 are connected to one another at the upper edges of the continuous cavity 302, thereby providing a continuous metal shielding for the circuits of the microwave board 20.

The continuous cavity 302 extends downwardly from the top surface 301, either in the form of a through cavity by extending from the top surface 301 to a bottom surface 311 of the support board 30 as shown in FIGS. 11 and 12, or in the form of pocket with predetermined thickness. Preferably, the continuous cavity 302 is a through cavity.

Optionally, in order to provide an enhanced electromagnetic shielding effect, the continuous cavity 302 may be divided, by an inner wall 310, into a first cavity 302 formed at a position of the support board 30 corresponding to the signal mixer 223 of the oscillator/mixer layer 22 and a second cavity 304 formed at a position of the support board 30 corresponding to the oscillator 221 of the oscillator/mixer layer 22. A communicating groove 312 is formed at the upper end of the inner wall 310 for accommodating the circuit components electrically connecting the signal mixer 223 and the oscillator 221.

The support board 30 further includes a first conductive via 314, serving as an I/O signal channel, and a second conductive via 316, serving as a power supply channel. Optionally, the first conducive via 314 and the second conductive via 316 are in the form of a plated half-hole. Accordingly, a half shielded cavity 340, indicated by the dash line in FIG. 11, is formed by the ground layer 26 of the microwave board 20, the first conductive via 314, the second conductive via 316, the first metal layer 330 formed on the top surface 301 of the support board 30, and the second metal layer 332 coated on the surface 305 of the continuous cavity 302.

Now referring to FIG. 12, a closed shielded cavity 350, indicated by the dash line, is depicted. The closed shielded cavity 350 is provided by the microwave board 20, the support board 30 and a baseboard 40. The baseboard 40 includes a top surface 401, positioned opposite to the bottom surface 311 of the support board 30. The top surface 401 of the baseboard 40 is at least partially coated with a third metal layer 334 covering the corresponding area of the continuous cavity 302. The third metal layer 334 is bonded to the bottom surface 311, such as soldered to the bottom surface 311. The fully shielded cavity 340, is formed by the ground layer 26 of the microwave board 20, the first conductive via 314, the second conductive via 316, the first metal layer 330 formed on the top surface 301 of the support board 30, the second metal layer 332 coated on the surface 305 of the continuous cavity 302, and the third metal layer 334.

The thickness of the metal coatings of the cavity package is a critical factor for the shielding effect the package, especially for the shielding effects of the PCB cavity in K-band high frequency. For example, the thickness of the metal coating can be calculated as a skin depth by the following equation:

$$\Delta = \sqrt{\frac{2}{\omega\mu\sigma}}$$

Where:
ω=angular frequency of the wave;
μ=permeability of the material;
σ=electrical conductivity of the material of propagation.

Preferably, under the circumstances where the temperature is a room temperature, the coating material is Cu and the microwave signal is in the K-band (24 GHz), the skin depth is:

$\Delta=0.066/\sqrt{f}=4.26\times10^{-7}$ m=0.4 um<<9 um(¼Oz), which is far below the thinnest thickness of ¼ Oz for most applications. Thus, for most applications, the above thickness is sufficient to provide a satisfying shielding effect. Additionally, the first conductive via 314 and the second conductive via 316 also contributes to the shielding effect.

The following is a comparative chart listing the manufacturing indices with respect to the traditional metal casting processes, the traditional ional metal stamping processes, and the novel PCB cavity packaging processes in accordance with the present invention. As seen from the chart, the novel PCB cavity packaging processes in accordance with the present invention exhibit better performances in every aspect of the manufacturing processes.

| Items | Metal Casting | Metal Punch | PCB Cavity |
| --- | --- | --- | --- |
| Weight | Heavy | Normal | Light |
| Cost | Expensive | Cheap | Cheap |
| Model tooling | Yes | Yes | No |
| I/O | Un-convenient | Un-convenient | Convenient |
| Assembling with PCB board | Complex | Complex | Automatic and Simple |
| Shielding Effects | Good | Normal | Normal |
| Consistency | Good | Normal | Very Good |
| Production Efficiency | Normal | Good | Very Good |

FIGS. 13, 14, 15A and 15B illustrates an improved adjustable baseboard 400 and a microwave planar sensor 100 according to another aspect of the present invention, which facilitates tuning or adjusting the detecting angle of the sensor 100, thereby providing a sensor with improved resilience and compatibility with respect to a variety of application circumstances.

Figure 13:
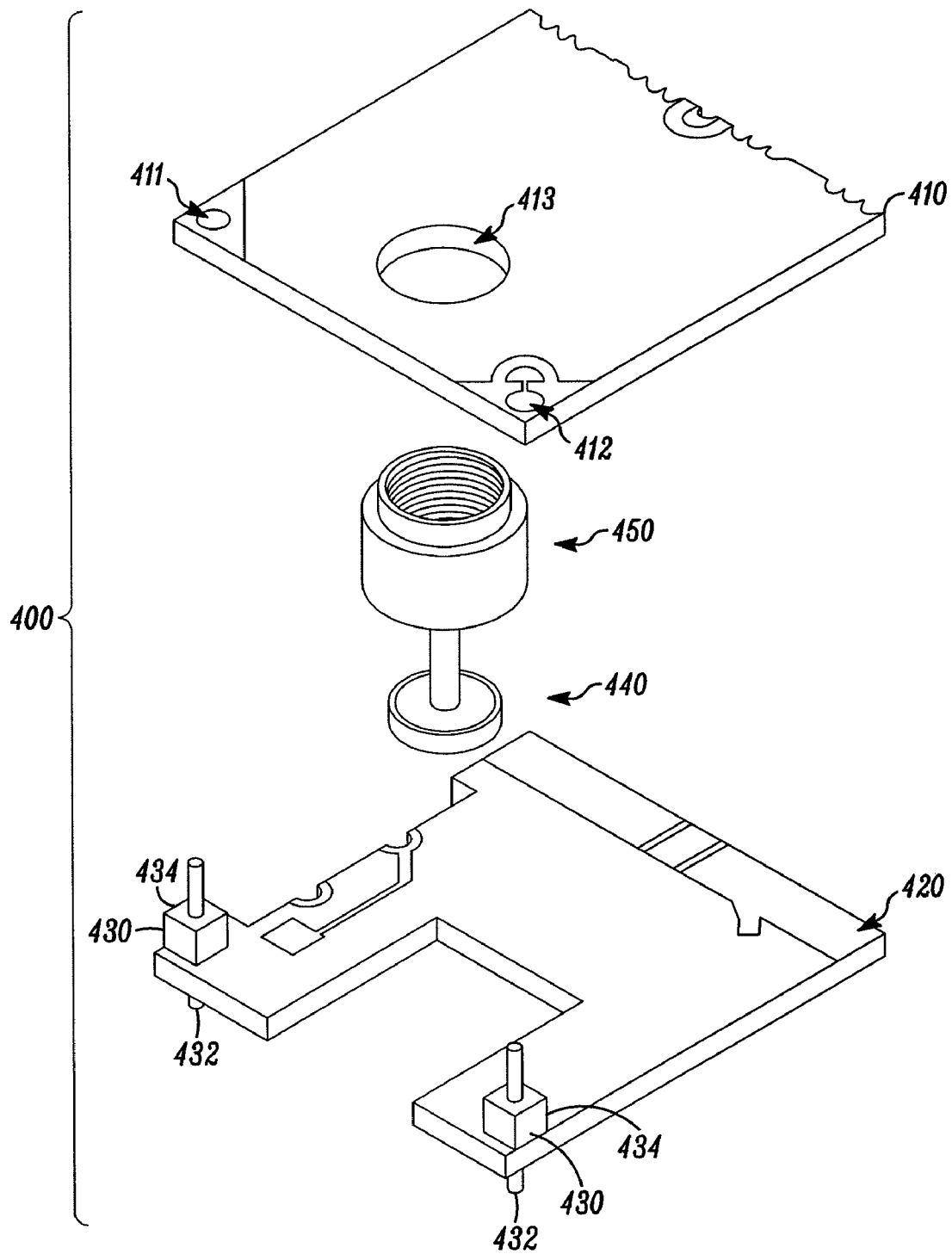
FIG. 13 is an exploded perspective view of a baseboard according to yet another exemplary embodiment of the present invention including a first sub-board and a second sub-board, the distance therebetween adjustable to change the detecting angle of the sensor.

Referring to FIG. 13, the baseboard 400 includes a first sub-board 410 and a second sub-board 420, with the distance therebetween adjustable by a pair of connectors 430. The connectors 430 are disposed between the first sub-board 410 and the second sub-board 420 to change the detecting angle of the sensor 100. In the shown exemplary embodiment, the connectors 430 are positioned adjacent to an edge of the baseboard 400, at the two corners of baseboard 400, respectively. However, it should be appreciated that the number and position of the connectors are not limited to the shown embodiment.

Specifically, the connectors 430 are configured to adjust the distance between the first sub-board 410 and the second sub-board 420, by each providing a post 432 and a block 434 movable relative to the post 432. The first sub-board 410 includes a pair of corresponding fitting holes 411 and 412 for receiving the upper ends of the posts 432. The dimensions of the fitting holes 411 and 412 are configured to be bigger than the dimensions of the posts 432. Thus, the upper ends of the posts 432 can be received without being fixed into the fitting holes 411 and 412. The second sub-board 420 includes a pair of corresponding fitting holes 421 and 423 (shown in FIG. 14), for receiving the lower ends of the posts 432.

For example, the post 432 has thread formed on the outer surface thereof, and the block 434 has a threaded hole for mating with the outer thread of the post 432. Thus, when the post 432 is fixed into the fitting holes 421 and 423 of the second sub-board 420, turning the block 434 moves the block 434 relative to the post, thereby tilting the first sub-board 410 relative to the second sub-board 420 so as to change the detecting angle of the sensor 100. Alternatively, a plurality of blocks having different dimensions may be used exchangeably to adjust the distance between the first sub-board 410 and the second sub-board 420.

In the shown embodiment, the first sub-board 410 and the second sub-board 420 are connected at one end thereof to implement necessary mechanical and electrical connections between the baseboard 400 and the other components of the sensor 100. However, it should be appreciated that other interfacing components can be provided between the first sub-board 410 and the second sub-board 420 for implementing the mechanical and electrical connections.

Figure 14:
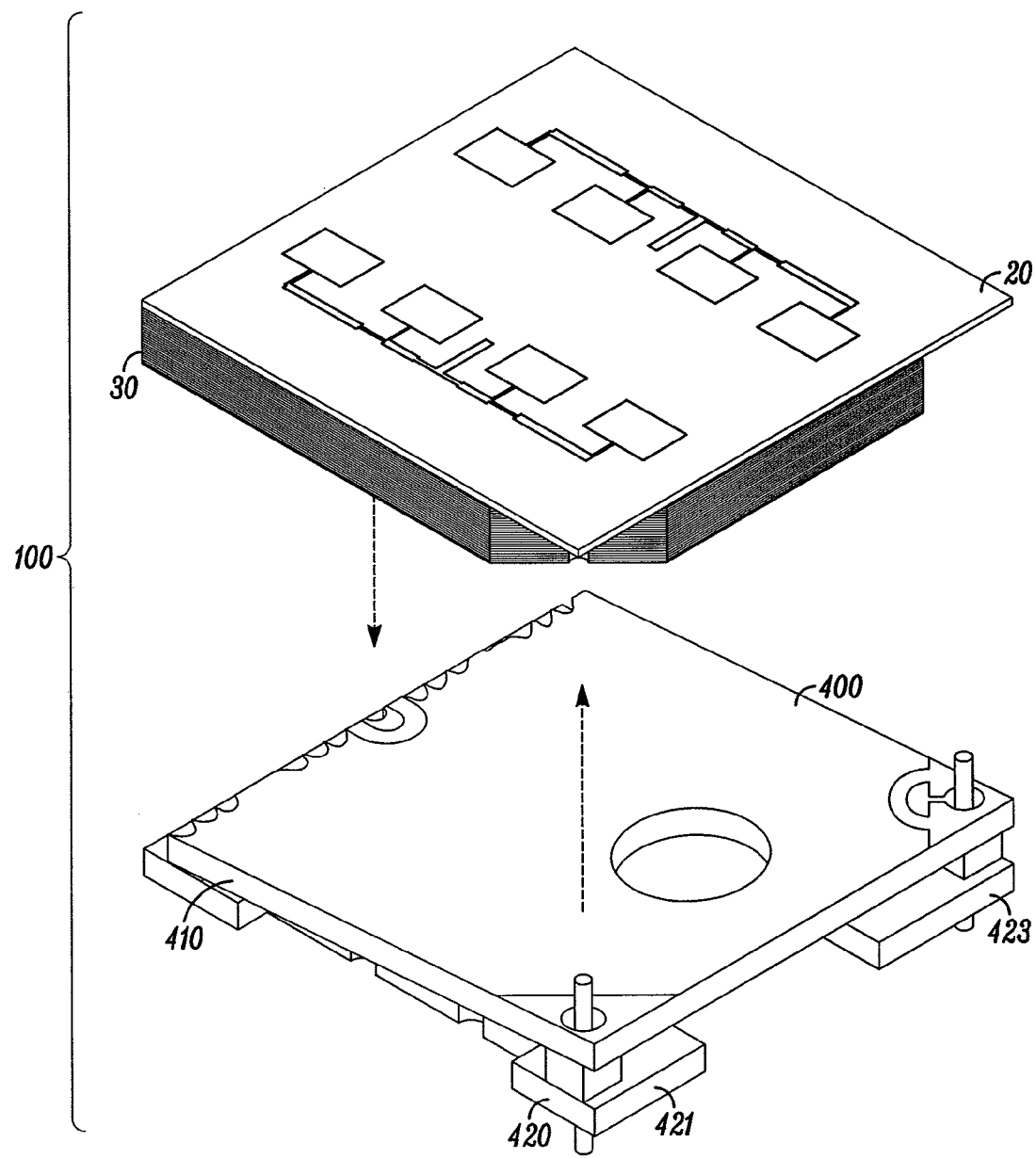
FIG. 14 is an exploded perspective view of a microwave sensor according to still an exemplary embodiment of the present invention incorporating the baseboard shown in FIG. 13.
Figure 15A:
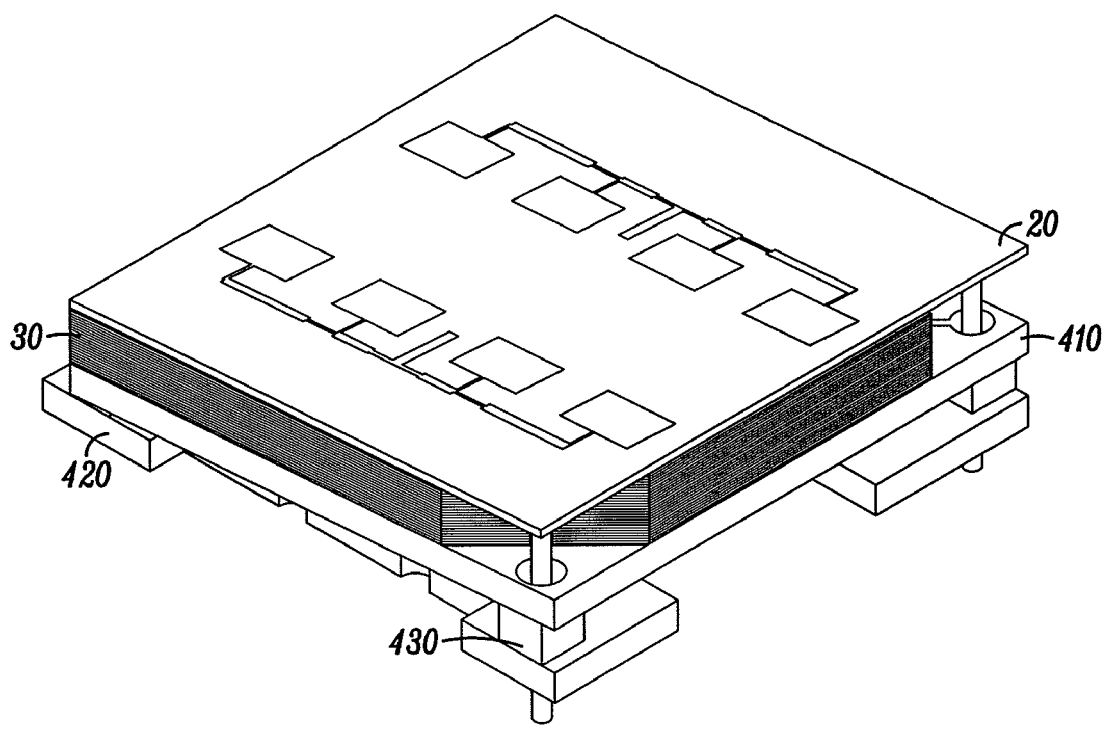
FIG. 15A is a compact perspective view of the microwave sensor shown in FIG. 14, viewing from a left perspective.
Figure 15B:
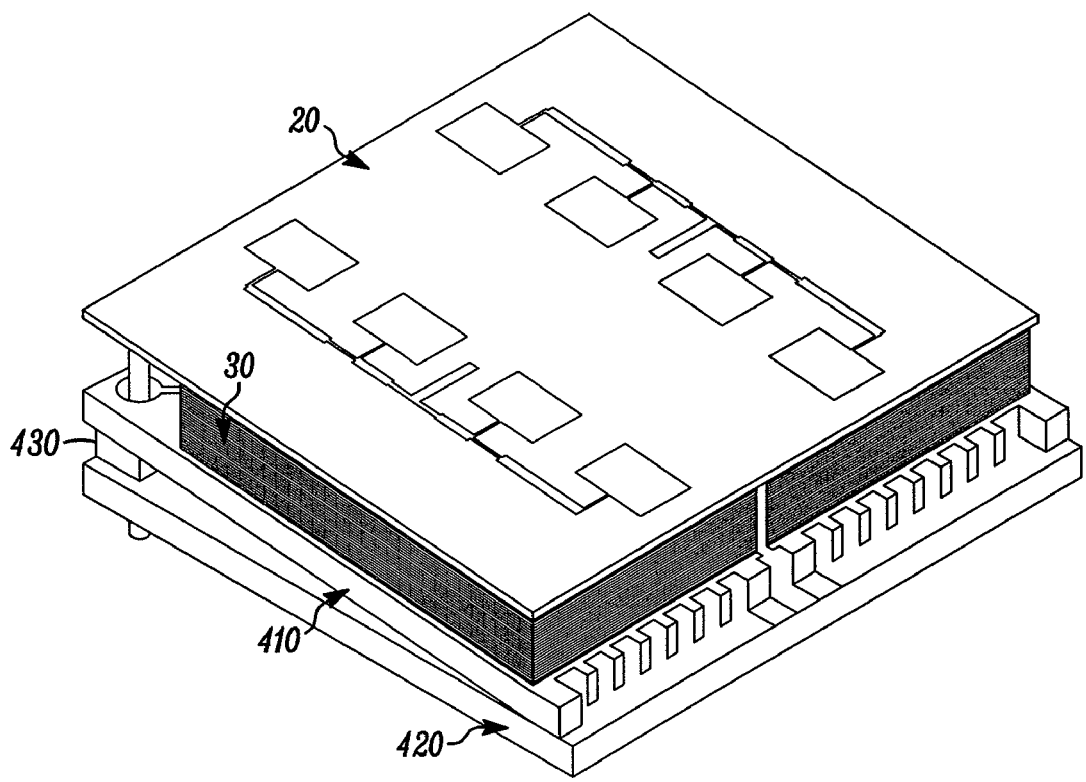
FIG. 15B is a compact perspective view of the microwave sensor shown in FIG. 14, viewing from a right perspective.

Optionally, a tuning screw 440 can be provided to the baseboard 400, for adjusting the operative frequency of the sensor 100. Preferably, the tuning screw 440 is assembled to an associated metal base 450 soldered to the first sub-board 410. FIGS. 14, 15A and 15B depict the resulted sensor connectors 100 in different perspective views.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A microwave planar sensor for detecting movement of a target in a detection area, comprising:
   a microwave board, comprising:
       an oscillator/mixer layer, comprising an oscillator configured to generate at least one microwave signal and a signal mixer electrically coupled to the oscillator, the signal mixer configured to combine a microwave signal generated by the oscillator and a reflected signal reflected by the target, thereby generating an intermediate frequency signal having a Doppler frequency;
       an antenna layer, comprising a transmit antenna coupled to the oscillator for transmitting a microwave signal generated by the oscillator into the detection area and a receive antenna coupled to the signal mixer for receiving the reflected signal; and
       a ground layer disposed between the oscillator/mixer layer and the antenna layer when the oscillator/mixer layer and the antenna layer are bonded together, and
   a support board, comprising:
       a top surface bonded to the oscillator/mixer layer of the microwave board through a first metal layer coated on the top surface; and
       a continuous cavity extending from the top surface for accommodating the oscillator and the mixer of the oscillator/mixer layer, the surface of the cavity coated with a second metal layer.

2. The microwave planar sensor of claim 1, wherein the oscillator comprises a power distributor disposed between the oscillator and the transmit antenna and between the oscillator and the mixer.

3. The microwave planar sensor of claim 2, wherein the transmit antenna comprises a microstrip and the power distributor comprises a corresponding microstrip, said microstrips substantially overlying each other when the oscillator/mixer layer and the antenna layer are bonded together.

4. The microwave planar sensor of claim 2, wherein the receive antenna comprises a microstrip and the mixer comprises a corresponding microstrip, said microstrips substantially overlying each other when the oscillator/mixer layer and the antenna layer are bonded together.

5. The microwave planar sensor of claim 3, wherein the ground layer comprises a first slot to provide coupling interface between the microstrip of the transmit antenna and the corresponding microstrip of the power distributor.

6. The microwave planar sensor of claim 4, wherein the ground layer comprises a second slot to provide coupling interface between the microstrip of the receive antenna and the corresponding microstrip of the mixer.

7. The microwave planar sensor of claim 1, wherein the continuous cavity comprises a first cavity for accommodating the mixer and a second cavity for accommodating the oscillator.

8. The microwave planar sensor of claim 7, wherein the first cavity and the second cavity are in communication through a groove.

9. The microwave planar sensor of claim 1, wherein oscillator/mixer layer comprises at least one conductive via, electrically coupled to the first metal layer and the ground layer.

10. The microwave planar sensor of claim 1, wherein the microwave board is made of a non-Teflon material.

11. The microwave planar sensor of claim 1, wherein the support board is made of a non-Teflon material.

12. The microwave planar sensor of claim 1, wherein the continuous cavity extends through the support board to provide a through cavity.

13. The microwave planar sensor of claim 12, farther comprising a baseboard coupled to a bottom surface of the support board.

14. The microwave planar sensor of claim 13, wherein the baseboard comprises a top surface bonded to the bottom surface of the support board through a third metal layer coated on the top surface of the base board.

15. The microwave planar sensor of claim 13, wherein the baseboard comprises a first sub-board and a second sub-board, movable relative to one another, the first sub-board including a top surface bonded to the bottom surface of the support board through a fourth metal layer coated on the top surface of the first sub-board.

16. The microwave planar sensor of claim 15, wherein the baseboard comprises at least one connector disposed between the first sub-board and the second sub-board, the connector configured adjustable to change the detecting angel of the sensor.

17. The microwave planar sensor of claim 16, wherein the connector comprises a post having an outer thread, and a block having an inner thread mating with the outer thread, such that the block is movable along the post through the mating of the outer thread and the inner thread.

18. The microwave planar sensor of claim 17, wherein an end of the first sub-board is connected to a corresponding end of the second sub-board, and the connector is positioned adjacent to the opposite ends of the first sub-board and the second sub-board for tilting the first sub-board and the second sub-board relative to one another.

19. The microwave planar sensor of claim 16, wherein the baseboard comprises a tuning screw for adjusting the operative frequency of the sensor.

20. The microwave planar sensor of claim 19, wherein the baseboard comprises a metal base associated with the tuning screw, the metal base soldered to the first sub-board.

* * * * *